United States Patent
Felner et al.

(10) Patent No.: US 11,741,718 B2
(45) Date of Patent: Aug. 29, 2023

(54) LIGHT INTERFERENCE DETECTION DURING VEHICLE NAVIGATION

(71) Applicant: Hitachi Astemo, Ltd., Ibaraki (JP)

(72) Inventors: Molly Lamoreau Felner, Ypsilanti, MI (US); Kota Irie, Novi, MI (US)

(73) Assignee: HITACHI ASTEMO, LTD., Hitachinaka (JP)

( * ) Notice: Subject to any disclaimer, the term of this patent is extended or adjusted under 35 U.S.C. 154(b) by 186 days.

(21) Appl. No.: 17/323,027

(22) Filed: May 18, 2021

(65) Prior Publication Data
US 2022/0374638 A1    Nov. 24, 2022

(51) Int. Cl.
| | |
|---|---|
| G06T 7/593 | (2017.01) |
| G06F 18/23 | (2023.01) |
| G06V 20/56 | (2022.01) |
| G05D 1/02 | (2020.01) |
| G06V 10/60 | (2022.01) |
| G06V 10/75 | (2022.01) |

(52) U.S. Cl.
CPC .......... *G06V 20/56* (2022.01); *G05D 1/0251* (2013.01); *G06F 18/23* (2023.01); *G06T 7/593* (2017.01); *G06V 10/60* (2022.01); *G06V 10/751* (2022.01); *G05D 2201/0213* (2013.01); *G06T 2207/10012* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 6,310,546 | B1* | 10/2001 | Seta | H04N 13/25 |
| | | | | 348/E7.086 |
| 9,860,446 | B2 | 1/2018 | Tico et al. | |
| 10,205,896 | B2 | 2/2019 | Kuang et al. | |
| 10,298,863 | B2 | 5/2019 | Silverstein et al. | |
| 2005/0275717 | A1* | 12/2005 | Camus | G06T 7/593 |
| | | | | 348/42 |

(Continued)

FOREIGN PATENT DOCUMENTS

| | | |
|---|---|---|
| JP | 2013-161190 A | 8/2013 |
| JP | 2015-215235 A | 12/2015 |

(Continued)

OTHER PUBLICATIONS

International Search Report and Written Opinion received in corresponding International Application No. PCT/JP2022/006779 dated May 10, 2022.

*Primary Examiner* — Idowu O Osifade
(74) *Attorney, Agent, or Firm* — Mattingly & Malur, PC

(57) ABSTRACT

In some examples, a processor may receive images from a camera mounted on a vehicle. The processor may generate a disparity image based on features in at least one of the images. In addition, the processor may determine at least one region in a first image of the received images that has a brightness that exceeds a brightness threshold. Further, the processor may determine at least one region in the disparity image having a level of disparity information below a disparity information threshold. The processor may determine a region of light interference based on an overlap between at least one region in the first image and at least one region in the disparity image, and may perform at least one action based on the region of light interference.

20 Claims, 10 Drawing Sheets

(56) References Cited

U.S. PATENT DOCUMENTS

| | | | |
|---|---|---|---|
| 2009/0243823 A1* | 10/2009 | Takahashi | H04N 13/246 |
| | | | 348/47 |
| 2013/0279814 A1 | 10/2013 | Iio et al. | |
| 2015/0165972 A1 | 6/2015 | Takemae et al. | |
| 2016/0173858 A1* | 6/2016 | Beon | G06V 20/584 |
| | | | 348/46 |
| 2016/0304098 A1* | 10/2016 | Ito | G06T 7/593 |
| 2018/0038689 A1 | 2/2018 | Takemura et al. | |
| 2019/0005691 A1 | 1/2019 | Takahashi et al. | |

FOREIGN PATENT DOCUMENTS

| | | |
|---|---|---|
| JP | 2019-164837 A | 9/2019 |
| JP | 2021-51476 A | 4/2021 |

* cited by examiner

LIGHT INTERFERENCE DETECTION DURING VEHICLE NAVIGATION

BACKGROUND

Advanced driver assistance systems (ADAS), as well as semi-autonomous vehicle systems, fully-autonomous vehicle systems, or otherwise autonomous driving (AD) systems are systems that automate or otherwise enhance vehicle control for improved safety, automated navigation, and the like. These systems typically employ multiple types of sensors for recognizing the roadway and for recognizing and avoiding other vehicles, obstacles, pedestrians, etc. In particular, cameras are sensors that may be relied on to capture a visual representation of the vehicle's surrounding environment, such as for performing street recognition, sign recognition, obstacle avoidance, and the like. Direct bright light impingement and reflected bright light impingement on the camera, such as from sunlight, oncoming headlights, emergency vehicle lights, or other bright light sources, may have the potential to cause light interference, such as bright spots, that may partially or totally blind a camera by obscuring features in captured images and making image recognition unreliable. Such a situation may reduce the ability of the vehicle to detect obstacles, other vehicles, pedestrians, lane markers, street signs, or the like.

SUMMARY

In some implementations, a processor may receive images from a camera mounted on a vehicle. The processor may generate a disparity image based on features in at least one of the images. In addition, the processor may determine at least one region in a first image of the received images that has a brightness that exceeds a brightness threshold. Further, the processor may determine at least one region in the disparity image having a level of disparity information below a disparity information threshold. The processor may determine a region of light interference based on determining an overlap between at least one region in the first image and at least one region in the disparity image, and may perform at least one action based on the region of light interference.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
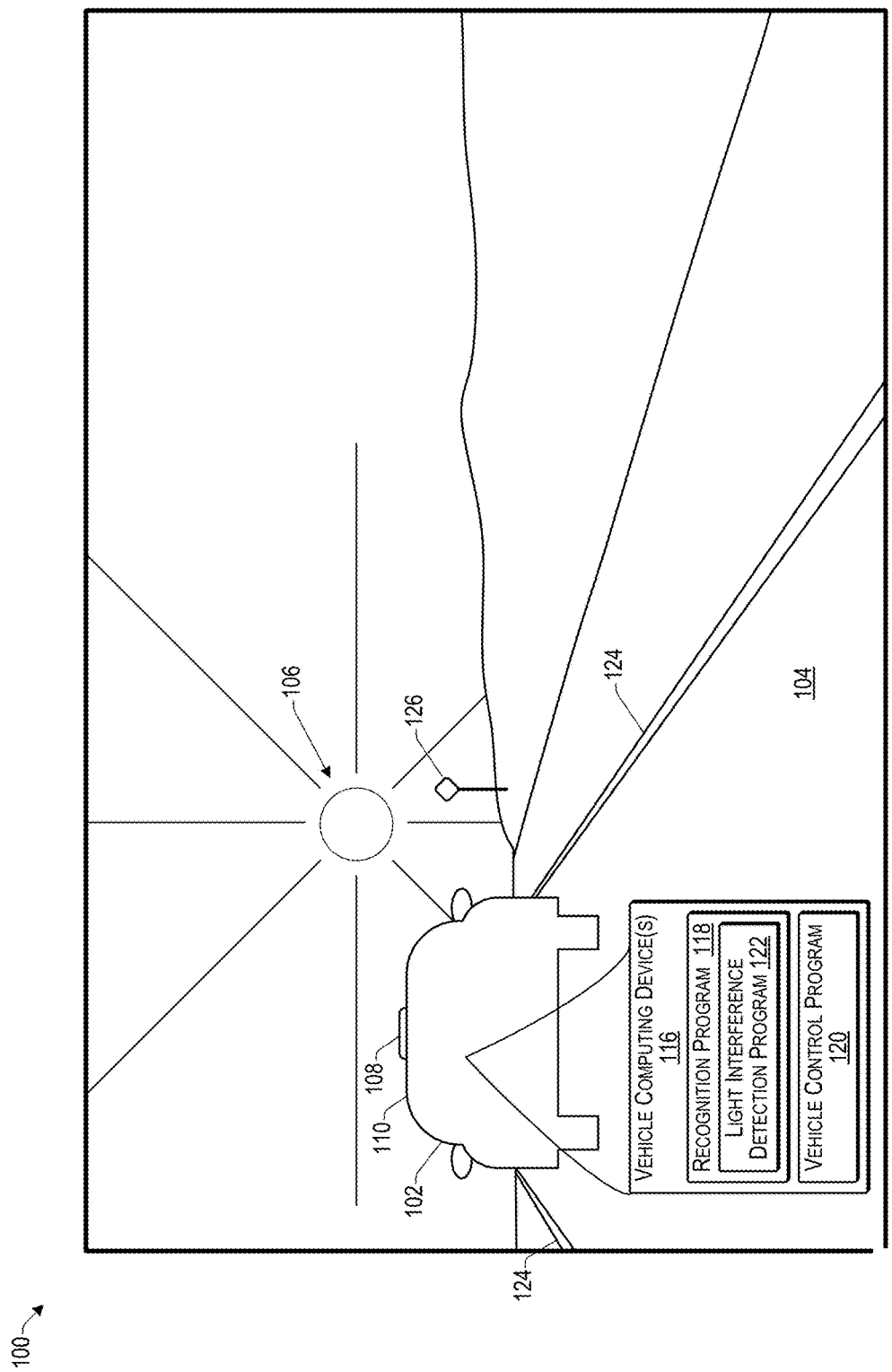
FIG. 1 illustrates an example system configured for detecting light interference according to some implementations.

Some implementations herein are directed to techniques and arrangements for identifying the presence of light interference (e.g., bright spots) in a camera field of view (FOV), such as from direct bright-light impingement or reflected bright-light impingement. For instance, the detection technique may be used for a stereo camera or a mono camera onboard a vehicle by examining both a standard image captured by the camera and a corresponding disparity image generated for the same scene and field of view (FOV). As one example, one or more processors onboard the vehicle may execute a recognition program that includes a light interference detection program that configures the processor(s) to recognize light interference that may affect the accuracy of the recognition results for the images received from the camera while the light interference is affecting the capabilities of the camera's image sensor(s). As one example, implementations herein may compare a first image captured by the camera image sensor(s) with a disparity image generated based on a parallax determined at least in part from the first image to identify a bright spot or other light interference detected by comparing the images.

In some cases, the recognition program may follow various rules that control timing of the execution of the light interference detection program to minimize the drain on the processing capacity of the onboard processor(s). For example, the recognition program may receive signals from an onboard digital compass, a brightness sensor, and/or a clock to determine whether the vehicle is above a threshold risk of being affected by light interference. For example, if the camera is likely to be facing a low-angle sun (the most common cause of light interference), such as within a threshold time after sunrise or before sunset, or if the vehicle is operating at night, such as when headlights of other vehicles or flashing lights of emergency vehicles are more likely to affect camera images, the recognition program may execute the light interference detection program along with the other image processing and recognition functions already being performed by the recognition program. In addition, the recognition program may receive local weather data, local sunrise and sunset times, and the like, and may consider this additional information when determining whether to execute the light interference detection program. As one example, an onboard TCU (telematics control unit) may be used to communicate over a cellular network for accessing various weather data and other local data.

In some examples, when light interference is detected that may compromise a region of interest in images captured by the camera, such as an area in front of the vehicle in a direction of travel, the system may be configured to respond with one or more actions, such as depending on the level of autonomy currently in effect on the vehicle. For instance, in a lower level system (e.g., autonomy levels 1-3 are in effect), the light interference detection program may cause a notification to be provided to the vehicle operator, such as an audible and/or visual warning to inform the operator that operation of some ADAS systems such as adaptive cruise control or automatic emergency braking may be temporarily suspended until lighting conditions improve. In addition, the notification may include a suggestion to clean the windshield (e.g., a dirty windshield may cause light reflection and corresponding bright spots on captured images) or perform one or more other actions in response to detecting the light interference.

In the case that the vehicle system is operating at a higher level of autonomy (e.g., autonomy level 4 or 5) and light interference is identified in a safety critical area, a visual and/or auditory notification may signal the driver to take over control of the vehicle within a threshold time, such as within 15 seconds, 30 seconds, etc., due to poor lighting conditions. The notification may further recommend that the vehicle operator clean the windshield or perform one or more additional actions. If the operator does not take control of the vehicle within the threshold time, the vehicle may be configured to slow down, pull over to the side of the road, or perform other safety actions. Additionally, such as in the case of a level 5 fully autonomous vehicle, if the vehicle is not equipped for driver control, the vehicle may be configured to slow down, pull over to the side of the road, or perform other safety actions automatically in response to detection of the light interference. In addition, in any of the scenarios discussed above, the vehicle may be configured to issue a notification of poor lighting conditions to nearby vehicles, such as through a DSRC (Dedicated Short Range Communications) service or similar communication system.

As defined by the Society of Automotive Engineers (SAE), there are six levels of driving automation from Level 0 to Level 5. In particular, at "Level 0" (no driving automation) the driver performs all operating tasks like steering, braking, accelerating, and so forth. At "Level 1" (driver assistance), the vehicle can assist with some functions (e.g., cruise control), but the driver still handles all accelerating, braking, and monitoring of the surrounding environment. At "Level 2" (partial driving automation), the vehicle may assist with steering or acceleration functions and allow the driver to disengage from some of their tasks. Adaptive cruise control is one of the example of Level 2 autonomy.

The concept of autonomous driving mainly starts from "Level 3" (conditional driving automation), in which the vehicle itself may monitor the surroundings and may exert some control over the vehicle (e.g., automatic emergency braking). At "Level 4" (high driving automation) a vehicle may be able to drive independently most of the time but will not operate unless all conditions are met and an operator is still required to be able to take over. At "Level 5" (full driving automation) the vehicle is able to drive anywhere in all conditions without an operator.

For discussion purposes, some example implementations are described in the environment of detecting and recognizing light interference, such as bright spots in images, that may reduce the effectiveness of a vehicle camera during navigation of the vehicle. However, implementations herein are not limited to the particular examples provided, and may be extended to other types of cameras, other techniques for determining disparity images, other types of vehicles, other types of roads and obstacles, other weather conditions, and so forth, as will be apparent to those of skill in the art in light of the disclosure herein.

FIG. 1 illustrates an example system 100 configured for detecting light interference according to some implementations. In this example, suppose a vehicle 102 is traveling on a roadway or other travel path 104 in a direction toward the sun 106, which is relatively low in the sky in this example. The vehicle 102 may include at least one camera system 108, which may be mounted on a roof 110 the vehicle 102. In the illustrated example, the camera system 108 may include a mono or stereo camera, such as a visible light camera and/or near infrared (IR) camera. Additionally, while the camera system 108 is illustrated mounted on the vehicle roof 110 in this example, in other examples, the camera system 108, or one or more other cameras, may be located in any of various different locations on the vehicle 102.

In some cases, the camera system 108 may capture continually images corresponding to a field of view (FOV) of the camera(s) while the vehicle 102 is in operation, e.g., at 10 frames per second, 15 frames per second, 30 frames per second, 60 frames per second, or any other desired frequency that provides images at a high enough rate to enable recognition of the travel path 104 and recognition of any obstacles in the travel path in time to take evasive action or otherwise adapt to the recognition information. As one example, the image capturing frequency (sampling frequency) of the camera system 108 may increase as the vehicle speed increases.

The vehicle 102 may include one or more vehicle computing devices 116, as discussed additionally below. In some examples, the vehicle computing device(s) 116 may execute a recognition program 118 and a vehicle control program 120. For instance, the recognition program 118 may be executed to receive the images captured by the camera(s) of the camera system 108 and may perform processing on the captured images to perform recognition for the current travel path 104 of the vehicle 102. The recognition program 118 may provide recognition information about detected and recognized features and obstacles to the vehicle control program 120 which may initiate one or more actions based on the recognition information, such as issuing a notification for warning a vehicle occupant, braking the vehicle 102, steering one or more wheels of the vehicle 102, or the like. The recognition program 118 may include or may execute a light interference detection program 122 that detects when a concentrated or otherwise bright light is affecting the ability of a camera to capture images that can be used for image recognition.

In some cases, the camera system 108 itself may include at least one vehicle computing device 116 that executes the recognition program 118. In other cases, the vehicle computing device(s) 116 may be separate from the camera system 108 and located elsewhere in the vehicle 102 for executing the recognition program 118. Further, in yet other cases, a portion of recognition program and/or light interference detection program 122 may be executed in the camera, and another portion may be executed at another computing device at another location onboard the vehicle. In any of these cases, the vehicle computing device(s) 116 may receive images from the camera system 108 and may process the images to detect the road, road features, signs, obstacles, other vehicles, and the like. In addition, the light interference detection program 122 may be executed to recognize light interference that may be affecting at least a portion of a camera image sensor.

In some examples, the recognition program 118 may generate a parallax-based disparity image from the received images, e.g., using stereo camera image pairs or successively captured mono camera images. In the case that a mono camera is used, as one example, a disparity map may be calculated using a trained machine learning model (not shown in FIG. 1) that may determine changes in distances of features, such as by taking into account a current vehicle speed and changes in sequentially captured images. For instance, initially, for training the machine learning model, a set of monocular images and their corresponding ground-truth parallax maps may be captured at various different speeds and used for training the machine learning model. Subsequently, the trained machine learning model may be executed onboard the vehicle to predict approximate values of a parallax map as a function of newly captured images.

Alternatively, in the case of a stereo camera or multiple mono cameras able to be used as a stereo pair, images may be captured by two cameras as stereo pairs. Differences between the captured images may be used to calculate a parallax using block matching techniques, such as semi-global block matching or any other suitable technique. Parallax information may be used to generate a disparity image. In some examples herein, a stereo camera system is used as an example system to explain some example implementations, but those of skill in the art will understand that similar arrangements and techniques may be applied using systems having a single mono camera or multiple mono cameras as well.

The disparity map may provide information to assist with detection and recognition of features in the camera FOV, such as the roadway, obstacles, lane markers, etc., as well as to estimate distances to the recognized features. The quality of the disparity map that is generated may correlate to the quality of the recognition and distance estimation performance A higher-quality or "dense" disparity map may provide more accurate disparity information. On the other hand, a lower-quality or "sparse" disparity map may provide information that is sufficiently accurate for most purposes herein. For example, creation of dense disparity maps is comparatively computationally expensive as compared to creation of sparse disparity maps, and may require a more expensive processing unit and memory and/or longer compute time. Thus, sparse disparity maps may be employed in some examples herein for reducing the computing requirements even though a dense disparity map may provide slightly more accurate results, and may be used instead if sufficient processing capacity is available.

In the illustrated example, suppose that the vehicle 102 is traveling in the general direction of the sun 106, and the sun 106 is sufficiently low in the sky (e.g., less than a threshold angle above the horizon) for the sunlight to impinge on the image sensor(s) of the camera system 108, such as by direct light and/or reflected light. For example, the direct or reflected sunlight may cause light interference, such as bright spots on images captured by the camera system 108, which may make it difficult for the recognition program 118 to recognize a surface of the road 104, lane markers 124, a road sign 126, or the like. Based on the time of day and the direction of vehicle travel, the recognition program 118 may cause the light interference detection program 122 to execute to detect that light interference is affecting the captured images.

As described additionally below, the light interference detection program 122 may compare an image captured by the camera system 108 with a disparity image that may be generated, at least in part from the captured image or one or more related images, such as from a stereo image pair that may have also been captured by the camera system 108. For instance, if the camera system 108 is capturing images at 60 frames per second, it may not be necessary to use the same image for comparison with the disparity map as the images used to generate the disparity image. Rather, a pair of images captured close in time to the image used for the comparison may be used to generate the disparity map and may still provide satisfactory results in detecting bright spots or other light interference. This flexibility can provide additional time to compute the disparity image prior to performing the comparison.

Of course, in other examples, one or both of the same images that are used to generate the disparity map may be compared to the disparity map for detecting the presence of any light interference. Upon detecting light interference in an area of interest (e.g., in an area including the travel path), such as for multiple comparisons over a threshold period of time, the light interference detection program 122 may send at least one signal that may cause at least one action to be performed by the vehicle and/or by a vehicle operator or other occupant. Additional features, variations, and advantages of the implementations herein are discussed below.

Figure 2:
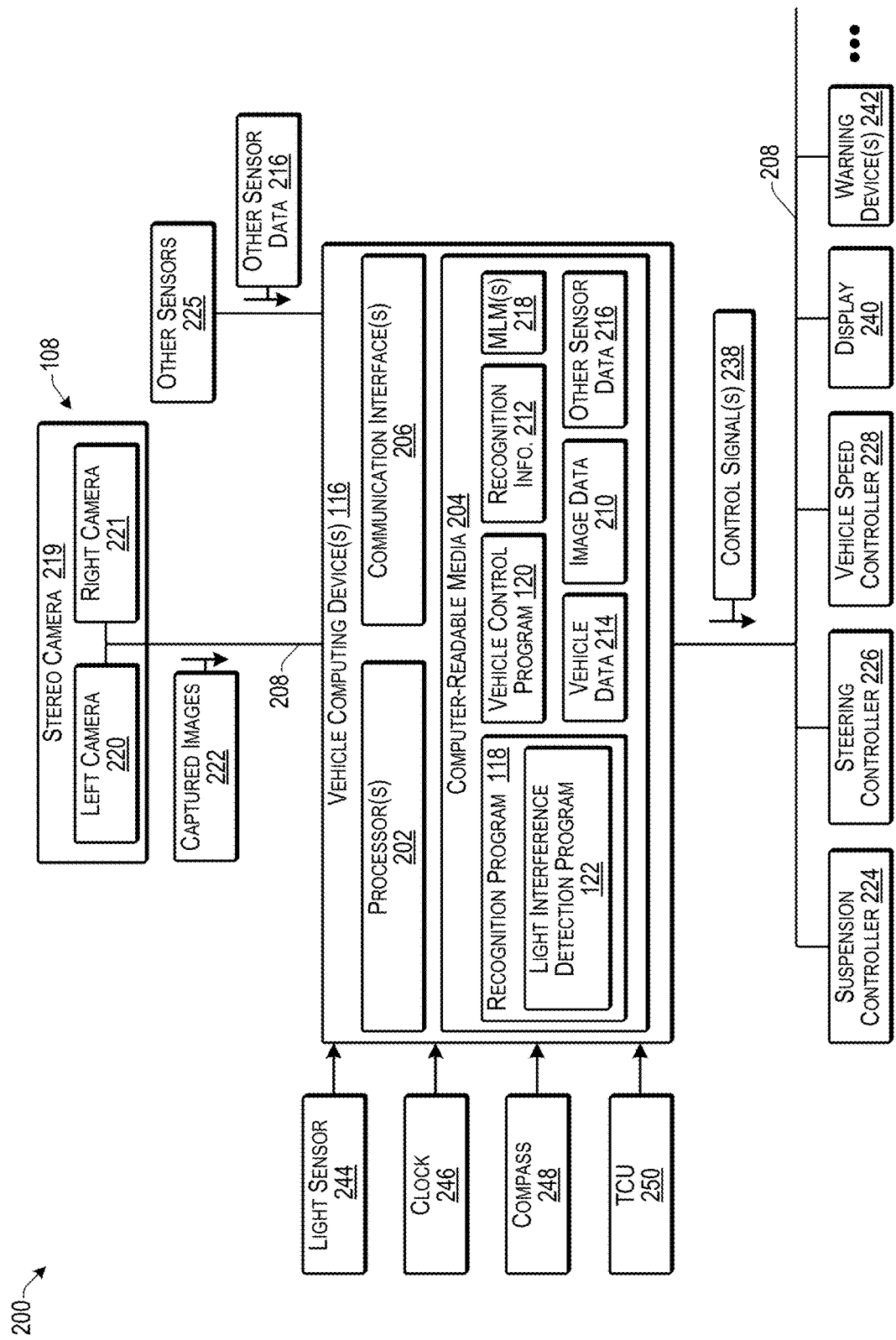
FIG. 2 illustrates an example architecture of a recognition and control system that may be included in the vehicle according to some implementations.

FIG. 2 illustrates an example architecture of a recognition and control system 200 that may be included in the vehicle 102 according to some implementations. Each vehicle computing device 116 may include one or more processors 202, one or more computer-readable media 204, and one or more communication interfaces 206. In some examples, the vehicle computing device(s) 116 may include one or more ECUs (electronic control units) or any of various other types of computing devices. For instance, the computing device(s) 116 may include one or more ADAS/AD ECUs for controlling critical vehicle systems to perform ADAS and/or AD tasks, such as navigation, braking, steering, acceleration, deceleration, and so forth. The computing device(s) 116 may also include other ECUs for controlling other vehicle systems.

ECU is a generic term for any embedded system that controls one or more of the systems, subsystems, or components in a vehicle. Software, such as the recognition program 118 and the vehicle control program 120 may be executed by one or more ECUs and may be stored in a portion of the computer-readable media 204 (e.g., program ROM) associated with the respective ECU to enable the ECU to operate as an embedded system. ECUs may typically communicate with each other over a vehicle bus 208 according to a vehicle bus protocol. As an example, the Controller Area Network bus (CAN bus) protocol is a vehicle bus protocol that allows ECUs and other vehicle devices and systems to communicate with each other without a host computer. CAN bus may include at least two different types. For example, high-speed CAN may be used in applications where the bus runs from one end of the environment to the other, while fault-tolerant CAN may be used where groups of nodes are connected together.

Each ECU or other vehicle computing device 116 may include one or more processors 202, which may include one or more of central processing units (CPUs), graphics processing units (GPUs), microprocessors, microcomputers, microcontrollers, digital signal processors, state machines, logic circuits, and/or any devices that manipulate signals based on operational instructions. As one example, the processor(s) 202 may include one or more hardware processors and/or logic circuits of any suitable type specifically programmed or configured to execute the algorithms and other processes described herein. The processor(s) 202 may be configured to fetch and execute computer-readable instructions stored in the computer-readable media 204, which may program the processor(s) 202 to perform the functions described herein.

The computer-readable media 204 may include volatile and nonvolatile memory and/or removable and non-removable media implemented in any type of technology for storage of information, such as computer-readable instructions, data structures, programs, program modules, and other code or data. For example, the computer-readable media 204 may include, but is not limited to, RAM, ROM, EEPROM, flash memory or other memory technology, optical storage, solid state storage, magnetic disk, cloud storage, or any other medium that can be used to store the desired information and that can be accessed by a computing device. Depending on the configuration of the vehicle computing device(s) 116, the computer-readable media 204 may be a tangible non-transitory medium to the extent that, when mentioned, non-transitory computer-readable media exclude media such as energy, carrier signals, electromagnetic waves, and/or signals per se. In some cases, the computer-readable media 204 may be at the same location as the vehicle computing device 116, while in other examples, the computer-readable media 204 may be partially remote from the vehicle computing device 116, such as accessible over a wireless network or the like.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the vehicle computing device 116. Functional components stored in the computer-readable media 204 may include the recognition program 118 and the vehicle control program 120, each of which may include one or more computer programs, applications, executable code, or portions thereof. For instance, the recognition program 118 may include the light interference detection program 122 discussed above. Further, while these programs are illustrated together in this example, during use, some or all of these programs may be executed on separate vehicle computing device(s) 116.

In addition, the computer-readable media 204 may store data, data structures, and other information used for performing the functions and services described herein. For example, the computer-readable media 204 may store image data 210, recognition information 212, vehicle data 214, other sensor data 216, and, in some examples, such as when a mono camera is being used, one or more machine learning models (MLM(s)) 218. Further, while these data and data structures are illustrated together in this example, during use, some or all of these data and/or data structures may be stored by or with separate computing device(s) 116. The computing device(s) 116 may also include or maintain other functional components and data, which may include programs, drivers, etc., and the data used or generated by the functional components. Further, the computing device(s) 116 may include many other logical, programmatic, and physical components, of which those described above are merely examples that are related to the discussion herein.

The one or more communication interfaces 206 may include one or more software and hardware components for enabling communication with various other devices, such as over the vehicle bus 208 and/or over one or more network(s) (not shown in FIG. 2). For example, the communication interface(s) 206 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, and the like, as additionally enumerated elsewhere herein.

The computing device(s) 116 may be able to communicate with the camera system 108 via the vehicle bus 208, direct connection, or any other type of connection for receiving image data 210 from the camera system 108. For example, as discussed in detail below, the recognition program 118 may receive the image data 210 from the camera system 108, and may perform recognition of features in the images. In the illustrated example, the camera system 108 includes a stereo camera 119 including a left camera 220 and a right camera 221. In other examples, however, the camera system 108 may include a mono camera in place of the stereo camera 219, and the machine learning model 218 may be used with a plurality of images captured using the mono camera for determining a disparity image.

In the example of FIG. 2, the received image data 210 may include capture images 222 which may include left and right image pairs in the case that the stereo camera 219 is used. For instance, some or all of the image data 210 may be received as raw image data without any substantial processing. Alternatively, in other examples, as discussed additionally below, e.g., with respect to FIG. 3, the camera system 108 may perform at least a portion of the recognition on the images rather than sending the raw image data to a separate vehicle computing device 116.

In addition, the computing device(s) 116 may receive vehicle data 214 from other systems and/or other sensors in the vehicle. For instance, the vehicle may include a plurality of other sensors 225 in addition to the camera system 108 that may provide sensor information used by the vehicle control program 120. Several non-exhaustive examples of other sensors 225 may include radar, lidar, ultrasound, a global positioning system (GPS) receiver, a thermal camera, other cameras, e.g., facing in other directions, and so forth. In addition, the vehicle data 214 used by the vehicle control program 120 may include information received from or associated with various vehicle systems, such as from a suspension controller 224 associated with the suspension system, a steering controller 226 associated with the steering system, a vehicle speed controller 228 associated with a braking and acceleration system, and so forth.

As one example, such as in the case of level 3-5 autonomy, the recognition program 118 may receive the captured images 222 from the camera system 108 continually as a portion of the image data 210, e.g., as the camera system 108 captures images of the travel path or other surroundings of the vehicle while the vehicle is in motion. Furthermore, the recognition program 118 may process the received image data 210 to recognize road features, obstacles, and so forth. The recognition program 118 may provide the recognition information 212 about any detected obstacles, road features, etc., to the vehicle control program 120 which, in the case of level 3-5 autonomy, may take one or more actions in response to the recognition information. In some examples, the vehicle control program 120 and/or the recognition program 118 may fuse or otherwise combine and consolidate the recognition information 212 determined from the image data 210 with the other sensor data 216 for providing additional available information to the vehicle control program 120 for controlling the vehicle.

For example, the vehicle control program 120 may use rule-based and or artificial intelligence-based control algorithms to determine parameters for vehicle control. For instance, the vehicle control program 120 may apply one or more additional machine learning models (not shown in FIG. 2) for determining an appropriate action, such as braking, steering, decelerating, accelerating, or the like. Furthermore, the vehicle control program 120 may send one or more control signals 238 to one or more vehicle systems in response to the recognition information 212. For example, the vehicle control program 120 may send control signals 238 to the suspension controller 224, the steering controller 226, and/or the vehicle speed controller 228. For instance, the control signals 238 may include a specified spring coefficient and/or damping control information sent to the suspension controller 224; specified steering angle sent to the steering controller 226 for steering one or more wheels; and/or specified braking or acceleration control information sent to the vehicle speed controller 228.

In addition, or alternatively, such as in the case that the vehicle is under control of a driver human driver, the vehicle control program 120 may send a control signal 238 to a display 240 to present an alert and/or may send a signal to one or more warning devices 242 such as an audible or visual warning device. Examples of warning devices 242 include speakers that may generate an audible alert, haptic devices that may generate a vibration or other type of tactile alert (e.g., in a seat or steering wheel), and/or a visual signaling device that may generate a visual alert.

For example, as discussed above, the light interference detection program 122 may be executed continuously or periodically (such as based on detected lighting conditions), and may generate a disparity image from the captured images 222, or use an already generated disparity image generated by the recognition program 118 from the captured image 222 for detecting light interference that may be affecting the accuracy of the recognition being performed by the recognition program 118. For example, in performing recognition to determine the distance of recognized obstacles and other features in the captured images 222, the recognition program 118 may already be configured to generate a disparity image as part of the image data 210, and may use the disparity image for determining distances to various features recognized in the captured images. In such a system, the light interference detection program 122 may use an already generated disparity image for performing the light interference detection herein, rather than having to generate the disparity image itself.

When light interference is detected, the light interference detection program 122 or the recognition program 118 may perform one or more actions, such as causing the vehicle control program 120 to send one or more control signals 238, e.g., to the display 240 and/or warning devices 242 to notify the vehicle occupant, and/or send control signals 238 to cause the vehicle to slow down, cause the vehicle to pull over, cause the vehicle to communicate with other vehicles, or the like, as discussed additionally below. In other examples, the light interference detection program 122 and/or the recognition program 118 may send the notification directly to the display 240 and/or the warning devices 242, and/or send a control signal 238 to the vehicle systems 224-228.

In addition, in some examples, such as in the case of level 4 and/or level 5 autonomy, the vehicle control program 120 may include a sensor fusion functionality that may receive the recognition information 212 and that may also receive the other sensor data 216. Sensor fusion may take into consideration all sensor detection results (e.g., lidar, radar, other cameras), may compare the results of the various sensors with those of other sensors, and may use the combined results for performing vehicle control. If the sensors disagree about the presence or location of one or more potential obstacles, the sensor fusion functionality may determine a confidence value for each sensor, may determine how many sensors agree, may determine whether current environmental conditions may be adversely affecting sensor performance, and the like, and may determine to a conclusion as to the likelihood that that a particular object is actually present.

For instance, the fusion functionality may compare and reconcile the recognition information 212 with the other sensor data 216 to provide a more complete indication of the surroundings of the vehicle to the vehicle control program 120. In some examples, the output of the light interference detection program 122 (e.g., the presence of light interference in a safety region of interest) may be associated with a confidence value. For instance, the confidence value may indicate to the sensor fusion functionality that the stereo camera is operating at reduced capability and that more weight should be given to the other sensor data 216 from the other sensors 225. Based on all this information, the vehicle control program 120 may determine whether operation of the vehicle should continue when the recognition information from the camera system 108 may be unreliable due to light interference.

Furthermore, the light interference detection program 122 and/or the recognition program 118 may determine whether to execute the light interference detection program 122. For instance, to minimize the amount of computational resources used by the light interference detection program 122, signals received from various onboard sensors may be used to determine whether to execute the light interference detection program 122. In particular, sunrise and sunset are high risk times for bright light interference due to the low angle of the sun, which may shine sunlight directly at the camera aperture. Accordingly, in some examples, the vehicle may include a light sensor 244, a clock 246, and a digital compass 248. Based on information received from these devices, the system, such as by execution of the recognition program 118 may determine whether it is likely that the light interference detection program 122 would be useful. For instance, information from the light sensor 244, the clock 246, and the compass 248 may be used by the recognition program 118 to determine the time of day, the likely angle of the sun in the sky, and the relative orientation of the sun to the vehicle. For example, if the recognition program determines that the vehicle is running and using the camera system 108 at a time of day close to sunrise or sunset (e.g., the sun is likely to be within a threshold angle of the horizon), and the vehicle is oriented towards the sun, then the recognition program may invoke or otherwise activate the light interference detection program 122.

Additionally, in some cases, the recognition program 118 may use information received via a TCU (Telematics Control Unit) 250 or other cellular or wireless connection for determining at least in part whether to execute the light interference detection program 122. For example, the recognition program 118 may receive weather information and local sunrise and sunset times, allowing the recognition program 118 to more accurately determine whether to execute the light interference detection program 122.

Figure 3:
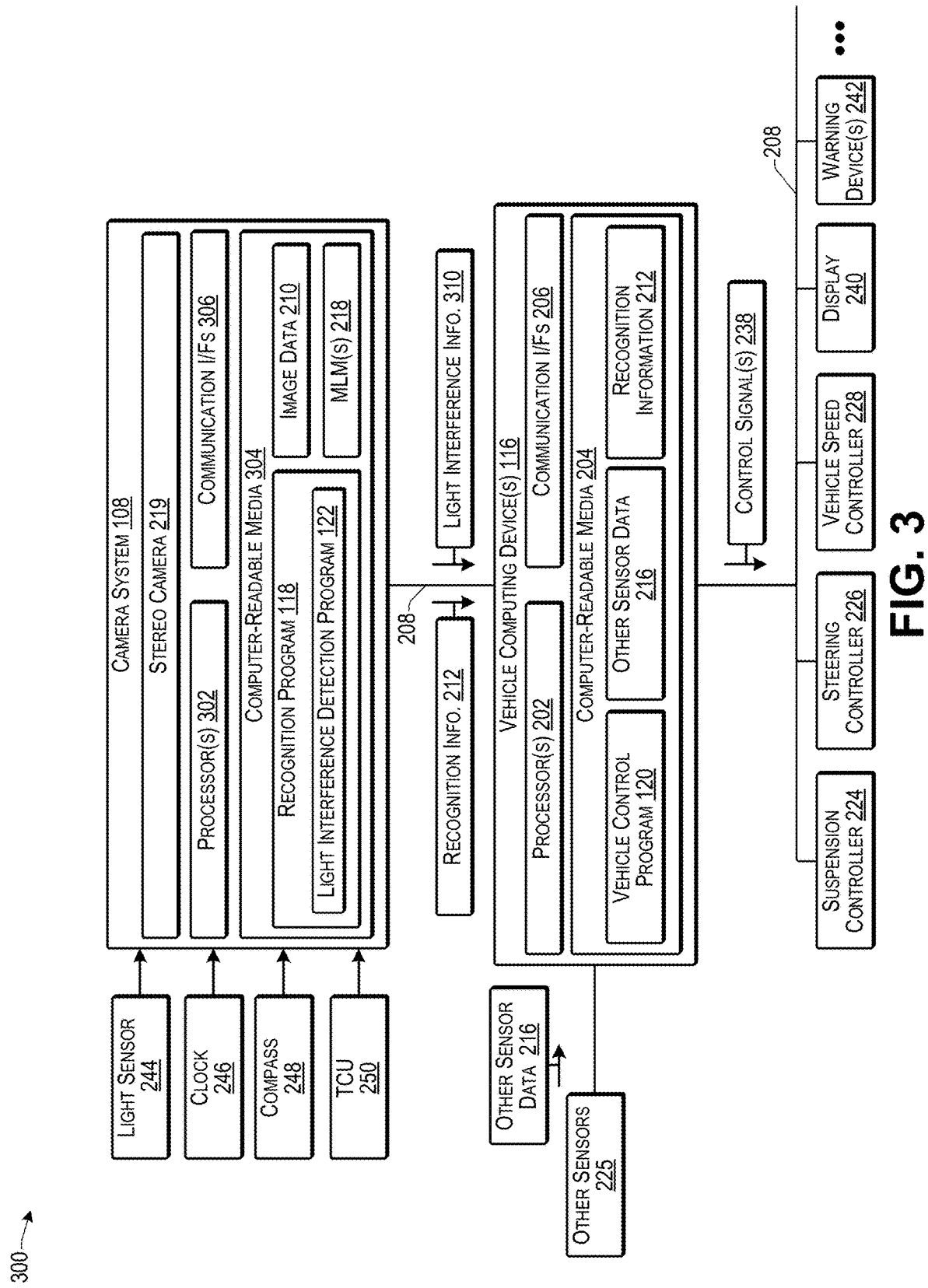
FIG. 3 illustrates an example architecture of a recognition and vehicle control system 300 that may be included in the vehicle according to some implementations.

FIG. 3 illustrates an example architecture of a recognition and vehicle control system 300 that may be included in the vehicle 102 according to some implementations. In this example, the camera system 108 may include processing capability for determining recognition information 212 independently of the other vehicle computing device(s) 116. Accordingly, the camera system 180 includes one or more processors 302, one or more computer readable media 304, and or more communication interfaces 306. The one or more processors 302 may be or may include any of the processors 202 discussed above with respect to FIG. 2, or other suitable processors for performing the operations described herein. Furthermore, the one or more computer readable media 302 may be or may include any of the computer readable media 204 discussed above with respect to FIG. 2, or other suitable computer readable media. Similarly, the communication interfaces 306 may be or may include any of the communication interfaces 206 discussed above with respect to FIG. 2 or other suitable communication interfaces.

In addition, the camera system 108 includes the stereo camera 219, which may include one or more lenses, one or more focusing systems, and one or more image sensors, as is known in the art (not shown in FIG. 3). In this example, the camera system 108 may execute the recognition program 118 and the light interference detection program 122 on the one or more processors 302. Accordingly, the stereo camera 219 may capture images in its field of view, and may store the captured images to the computer readable media 304 as a portion of the image data 210.

In some examples, the recognition program 118 receives the image data 210 from the camera system 108. For example, the recognition program 118 may continually receive image data 210 from the camera system 108 into a memory buffer (not shown in FIG. 3) in the computer readable media 304 as the captured images 122 are captured. Further, the recognition program 118 may perform recognition processing on the received images as discussed above. The recognition program 118 may send recognition information 212 to the vehicle computing devices 116 in real time. The vehicle control program 120 may process the recognition information 212 for controlling the vehicle as discussed above with respect to FIG. 2 and as discussed additionally below.

As mentioned above, the vehicle control program 120 may include a sensor fusion functionality that may receive the recognition information 212 and that may also receive the other sensor data 216. For example, the fusion functionality may compare and reconcile the recognition information 212 with the other sensor data 216 to provide a more complete indication of the surroundings of the vehicle to the vehicle control program 120. Based on a confidence level associated with the recognition information 212 and/or the light interference information 310, as well as confidence levels associated with the other sensor data 216, the vehicle control program may determine whether operation of the vehicle should continue when the recognition information from the camera system 108 may be unreliable due to light interference.

In addition, similar to the example discussed with respect to FIG. 2, the recognition program 118 may invoke the light interference detection program 122 continuously or periodically, such as based on determined lighting conditions that may affect the stereo camera 219. The light interference detection program 122 may generate a disparity image from received images or may use an already generated disparity image for performing the light interference detection herein. For instance, the light interference detection program 122 may determine areas of the received images that exceed a brightness threshold and compare those areas with areas of the disparity image for determining whether the disparity information in these areas is below a threshold for detecting light interference. Further, the light interference detection program 122 may determine whether the detected light interference is affecting the camera image sensor(s) in an area of interest, such as an area in the direction of travel, in the roadway, or other areas that may be necessary for safe navigation.

When light interference is detected, the light interference detection program 122 or the recognition program 118 may perform one or more actions, such as sending light interference information 310 to the vehicle control program to cause the vehicle control program 120 to send one or more control signals 238, e.g., to the display 240 and/or warning devices 242 to notify the vehicle occupant, and/or send control signals 238 to cause the vehicle to slow down, cause the vehicle to pull over, cause the vehicle to communicate with other vehicles, or the like, as discussed additionally below. Similar to the example of FIG. 2 discussed above, the vehicle control program 120 may send one or more control signals 238 to one or more vehicle systems 224, 226, 228, 240, and/or 242 based on the received recognition information 212 and the other sensor data 216. In addition, similar to the example discussed above with respect to FIG. 2, the camera system 108 may receive input from a light sensor 244, a clock 246, a compass 248 and/or a TCU 250 for determining when to execute the light interference detection program 122.

Figure 4:
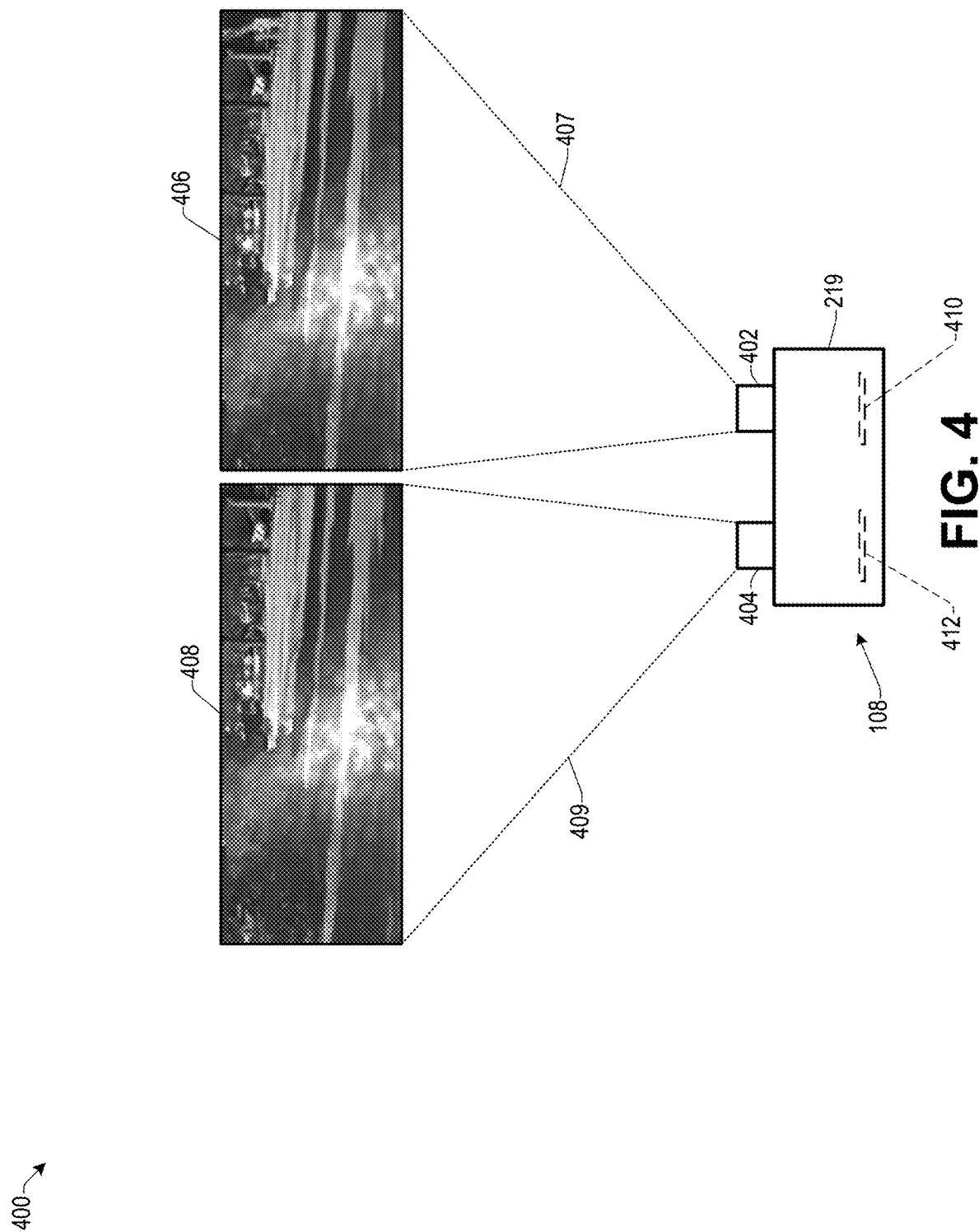
FIG. 4 illustrates an example of image capture performed by the camera system according to some implementations.

FIG. 4 illustrates an example of image capture 400 performed by the camera system 108 according to some implementations. In this example, the camera system 108 includes the stereo 219. For instance, the stereo camera 219 may include a right lens 402 and a left lens 404. The right lens 402 may capture a right image 406 within a right field of view (FOV) 407 and the left lens 404 may capture a left image 408 within a left FOV 409. In the illustrated example, the stereo camera 219 includes a right image sensor 410 for capturing images through the right lens 402 and a left image sensor 412 for capturing images through the left lens 404. In other examples, the stereo camera 219 may include a single image sensor (not shown in FIG. 4) that alternately captures images through the right lens 402 and the left lens 404.

The system (e.g., the system 100, 200, and/or 300) may use the right and left images 406 and 408, respectively, to determine a parallax image which is referred to as a disparity image. For instance, the system may calculate the disparity image using the stereo right and left images 406 and 408, such as based on a block matching method. As one example, as is known in the art, if a point $P_L=(u1, v1)$ in the left image 408, the corresponding point $P_R=(u2, v2)$ in the right image 406 may be at the same height as $P_L$ when $v1=v2$ as measured from a common baseline. Thus, the parallax measurement may be determined using a simple stereo camera theory in which the parallax may be defined as:

$$d = u2 - u1 \qquad \text{EQ(1)}$$

Based on the determined parallax, implementations herein may determine the disparity image by determining the depth information of a 3D point from the parallax since the disparity is inversely proportional to the corresponding parallax. Accordingly, the depth may be calculated using left and right images and the actual disparity, e.g.:

$$Z = fb/d \qquad \text{EQ(2)}$$

where Z is the distance (depth) along the camera axis, f is the focal length in pixels, b is a baseline in meters, and d is the disparity in pixels.

Figure 5:
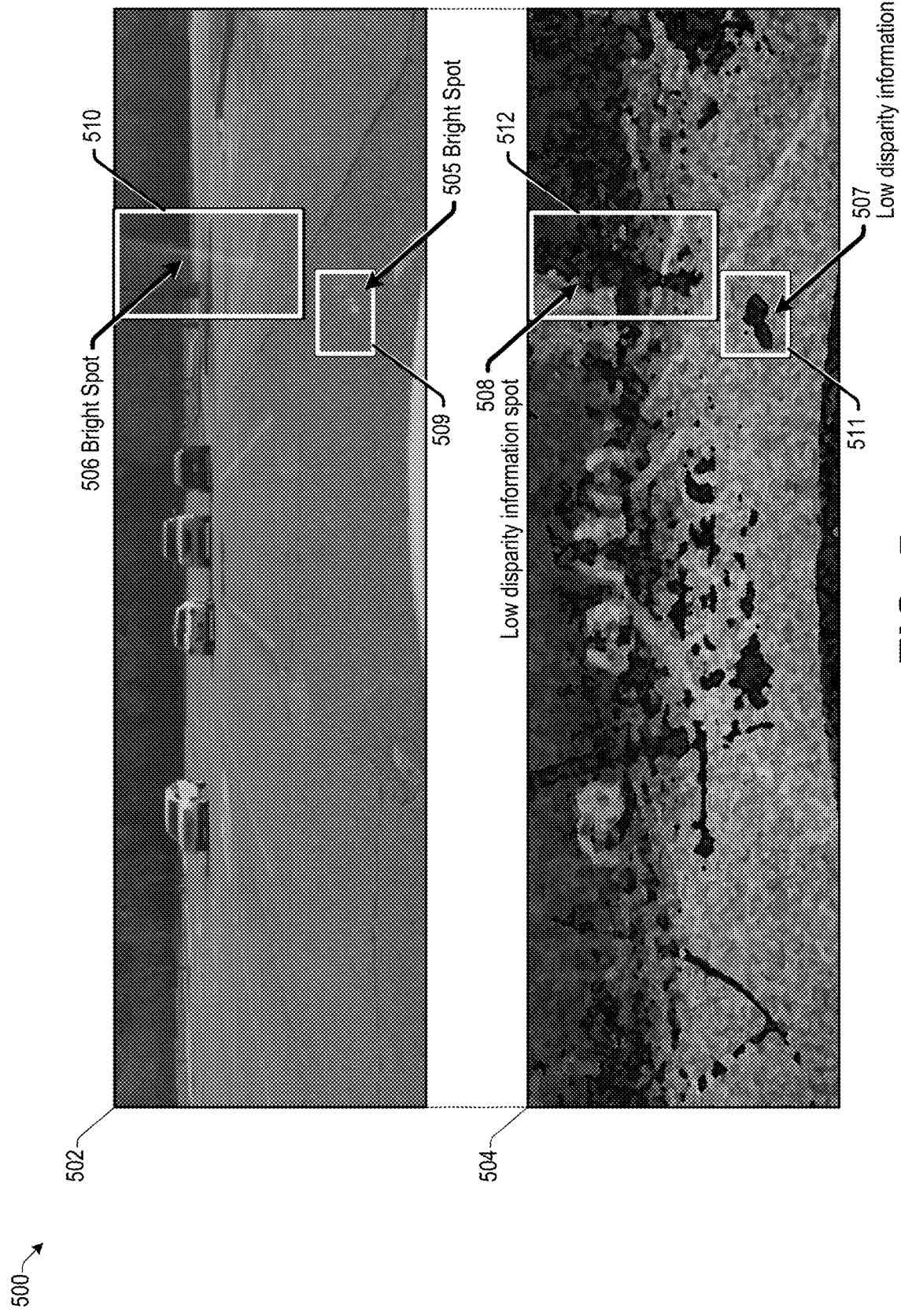
FIG. 5 illustrates an example of comparing a standard captured image with a corresponding disparity image for detecting light interference according to some implementations.

FIG. 5 illustrates an example 500 of comparing a standard captured image 502 with a corresponding disparity image 504 for detecting light interference according to some implementations. The captured image 502 may be a standard visual image and may correspond to the disparity image 504 by being of the same scene or approximately the same scene. For instance, the captured image 502 may be one of the images (left or right image) captured by the stereo camera and used for generating the disparity image 504. Alternatively, the captured image may be an image captured close in time (e.g., within the same second, half second, etc., dependent on vehicle speed and motion) as the captured images that are used to generate the disparity image 504. The light interference detection program 122 may be executed to detect when light interference is affecting the captured images, such as in environments with harsh sun exposure or other bright light situations.

As mentioned above, a stereo camera is able to capture two types of data: standard visual data captured by the left and right cameras, as well as data regarding the distance to detected objects and other points in the surrounding environment that may be generated by comparing the left and right images, and which may be used for generating the disparity image 504. Areas of high light reflection and other bright light interference may appear as bright spots 505 and 506 on the stereo camera's standard visual captured image 502. This is indicative of bright light impingement on the image sensor of the camera and interferes with the ability of the recognition program to recognize objects.

The light interference also can interfere with the ability of the recognition program 118 to determine distances. For example, low disparity information spots 507 and 508 may be present in the corresponding disparity image 504 and may correspond to the bright spots 505 and 506, respectively. On the disparity image 504, areas of bright light reflection or other bright light interference may appear as a lack of disparity data (e.g., black areas in this example). However, even good disparity images that are not affected by light interference may naturally tend to have some areas of low disparity data due to differences in materials or light conditions. Accordingly, a lack of disparity data alone is not sufficient for identifying light interference. For instance, the disparity image 504 has other black areas, indicating poor disparity data, that do not correspond to bright spots. For example, the black areas of low disparity data may be due to surface properties and environmental conditions.

In view of the foregoing, implementations herein identify bright spots and other light interference by comparing both the standard visual captured image 502 with the disparity image 504. For example, light interference may correspond to a bright spot as an area of white pixels or of local brightness on the standard visual captured image 502 and as an area of low or no disparity data on the disparity image 504 (e.g., below a threshold level as compared to a remainder of the disparity image 504). By examining both these images 502 and 504 together, areas affected by light interference can be identified and therefore may be determined to be areas of low reliability. For example, the squares 509 and 510 in the captured image 502, and the squares 511 and 512 in the disparity image 504 may indicate areas of low reliability for object and distance recognition.

A common technique in automotive applications of image processing is object tracking. The object recognition performed based on the captured images may sometimes not be smooth and continuous. For instance, the recognition program 118 may intermittently detect and then lose an object as the vehicle moves. As one example, a detected object may be "lost" by the object recognition program temporarily for a camera frame or two, e.g., a fraction of a second, and then may be detected again. To improve the usability of the detection results, the recognition program 118 may track the object over multiple frames, based in part on the speed and direction of the vehicle. Accordingly, if the previously detected object is momentarily lost, its expected location can be tracked until the object is detected again.

By utilizing this method an object momentarily lost by the object detection due to occlusion by light interference can be tracked and redetected if it is only occluded for a few moments. On the other hand, continuous occlusion of an object by light interference may render the object invisible to the camera and the recognition program 118. If the light reflection is in a safety critical area, such as in front of the vehicle, then any vehicle, pedestrian, or other obstacle moving or stopping in that region may not be captured by the camera, which could result in a collision.

By augmenting traditional object detection and recognition functions with the light interference detection techniques herein, the recognition program 118 is able to identify areas of the image that could cause an interruption to the object detection functions. This informs the tracking algorithm of the recognition program 118 that the object may have been lost due to light reflection, indicating that recognition program 118 should continue tracking the object until the object emerges from the area affected by the light interference.

If the light interference should persist for a threshold amount of time in an area of interest (e.g., an area in front of the vehicle, an area in a direction in which the vehicle is turning, etc.) then the recognition program 118 may be configured to send a communication to the vehicle control program to perform one or more actions in view of the light interference and based on the level of autonomy of the vehicle's operating state. In a low level system (e.g., autonomy level 1-3), the driver is in control at all times, so ADAS functionality relying on the stereo camera, such as automatic emergency braking (AEB) and/or adaptive cruise control (ACC), can be deactivated safely after providing a visual and/or auditory warning to the vehicle operator. Further, all autonomy levels of vehicle systems may attempt to alert surrounding vehicles of poor lighting conditions if equipped for such communication.

In addition, in the case that the vehicle is operating with level 4 autonomy, the system may alert the vehicle operator to take back control based on detection of persistent light interference. In this case, once light interference is identified in the safety region of interest for a threshold time, the light interference detection program may send a communication to cause the vehicle to alert the operator with a visual and auditory warning. The operator may be instructed to take control of the vehicle within a designated amount of time. If the driver does not take control of the vehicle, the vehicle control program may be configured to slow down the vehicle and/or pull over to the side of the road.

Further, in the case that the vehicle is operating with a level 5 autonomy, the vehicle occupant may not be able to take over operation of the vehicle. Accordingly, when light interference is detected in the safety area of interest, and the vehicle system is unable to compensate using other sensors on board the vehicle, the vehicle may alert the occupant(s) with a visual and/or auditory warning. Further, the vehicle control program may cause the vehicle to safely slow down and/or pull over to the side of the road. The response in this case may also depend on whether the vehicle system is equipped for human operation.

FIGS. 6-10 include flow diagrams illustrating example algorithms or other processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 6:
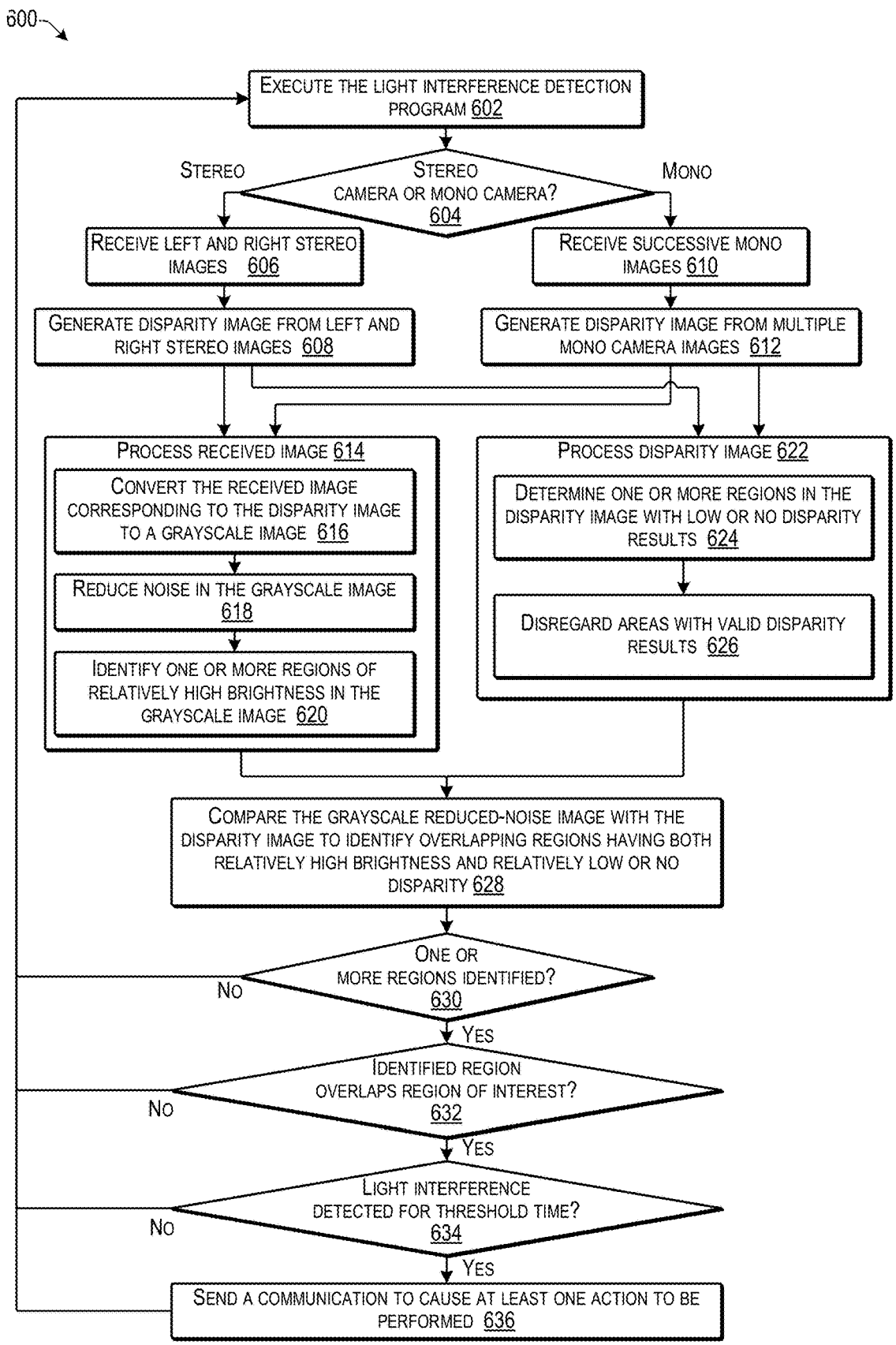
FIG. 6 is a flow diagram illustrating an example process for detecting light interference according to some implementations.

FIG. 6 is a flow diagram illustrating an example process 600 for detecting light interference according to some implementations. In some examples, the process 600 may be executed by the systems 100, 200, and/or 300 discussed above, such as by execution of the recognition program 118, the light interference detection program 122, and/or the vehicle control program 120.

At 602, the system may execute the light interference detection program. For example, based on the process 700 described below with respect to FIG. 7, the system may determine whether to execute the light interference detection program 122.

At 604, the system may determine whether the camera being used is a stereo camera or a mono camera. For instance, a first procedure may be used for generating a disparity image in the case of a stereo camera, and a second procedure may be used for generating the disparity image in the case of a mono camera.

At 606, in the case of a stereo camera, the system may receive left and right stereo images captured by the stereo camera.

At 608, the system may generate a disparity image from left and right stereo images. An example of generating a disparity image is discussed above, e.g., with respect to FIGS. 4 and 5.

At 610, in the case of a mono camera, the system may receive successive mono images captured by the mono camera.

At 612, the system may generate the disparity image from the multiple successive mono camera images. As one example, the system may use a machine learning model that takes into consideration the speed of the vehicle and the frequency at which frames are being captured by the mono camera for determining distances to various features in the mono images. Further, while a machine learning model is provided as one example for performing this function, in other examples, the disparity image may be generated heuristically without using a machine learning model.

At 614, the system may process at least one of the received images using the operations of blocks 616-620. As mentioned above, the image may be a standard visual image captured by either the left or right side of the stereo camera. Alternatively, in the case of a mono image, the image processed may be one of the images captured in succession by the mono camera. For example, the image processed at 614 may be one of the same images used to generate the disparity image or may be an image captured close in time to the images used to generate the disparity image so that the received image processed at 614 corresponds to the disparity image generated at 608 or 612 by being of approximately the same scene as the disparity image.

At 616, the system may convert the received image corresponding to the disparity image to a grayscale image to enable easier distinguishment of light and dark areas.

At 618, the system may reduce noise in the grayscale image. For example, any of numerous known noise reduction algorithms may be employed.

At 620, the system may identify one or more regions of relatively high brightness in the grayscale reduced noise image. For example, the system may examine individual pixels of the image for comparison with a threshold level of brightness and may perform clustering on pixels that exceed the brightness threshold to determine any bright spots in the image. Additionally, or alternatively, in some examples, template matching may be used for detecting bright spots in the image. For instance, template matching may include searching the whole image for a feature of interest using one or more templates of the feature. Template matching involves creating a template of a target feature to search for in the image. For instance, the template may include one or more examples of a bright area, such as a starburst, lens flare, bloom, etc. The template may be "dragged" across the image so that every area of the image is compared to the template. The template matching process may output a list of potential locations in the image that may at least partially match the template. For example, the list may be organized according to the closeness of the match.

As another example, one or more machine learning models, such as a neural network, classifier, or the like, may be trained on a training set of images at least some of which may include known light interference. Once the machine learning model has been trained to an acceptable accuracy, the machine learning model may be used for detecting bright spots in the standard image. A similar machine learning model may be trained for recognizing low disparity areas in the disparity image, as discussed additional below at block 624. Thus, a machine learning model might be used for detection on only the standard image or only on the disparity image. As another example, a separate machine learning model trained for the standard image may operate in parallel with a separate machine learning model trained for the disparity image. Furthermore, as still another example, a single machine learning model may be trained to receive both the standard image and the disparity image (or at least matching regions of these images) for identifying areas of light interference using information from both the standard image and the disparity image concurrently. Numerous other variations will be apparent to those of skill in the art having the benefit of the disclosure herein.

At 622, the system may process the disparity image using the operations of blocks 624 and 626.

At 624, the system may determine one or more regions in the disparity image with low or no disparity results. For example, the regions of low/no disparity may be determined based on identifying and clustering of pixels that are black below a threshold level as compared to a remainder of the disparity image. Additionally, or alternatively, in some examples, the low/no disparity regions may be determined based in part on comparison with any bright regions identified at 620. For example, since low disparity areas may be relatively common in some images, it may be more efficient to first determine the bright regions in the standard image and then check the corresponding areas in the disparity image for low or no disparity information. Thus, in some cases, block 624 may be combined with block 628 below. Additionally, as another example, as mentioned above, a machine learning model may be trained on a plurality of images known to have low disparity areas due to light interference. The trained machine learning model may be used subsequently to recognize the low/no disparity areas in the disparity image.

At 626, the system may disregard any identified areas with valid disparity results. For example, if the search of the standard image returns candidate areas for light interference (e.g., meeting a threshold requirement for a likelihood of being light interference), the system may check the disparity results at those areas. If the disparity image at that location shows normal disparity results, then there is no light interference and the location is discarded as a potential instance of light interference. If all locations are discarded, then there is currently no light interference, and the vehicle continues operation with no change (or returns to normal operation from light reflection mode). In some examples, block 626 may be performed after block 628.

At 628, the system may compare the grayscale reduced-noise image with the disparity image to identify overlapping regions having both relatively high brightness and relatively low or no disparity to identify the overlapping regions as regions having light interference. For instance, the system may use block matching or various other techniques to match regions of brightness in the received image with regions of low/no disparity in the disparity image for determining regions that overlap. Further, the overlapped light interference regions may be required to exceed a threshold size, such as exceeding a threshold number of pixels or a threshold percentage of the image size, or the like.

At 630, the system may determine whether one or more light interference regions were identified at 628. If so, the process goes to 632. If not, the process goes to 602 to process a next set of images.

At 632, the system may determine whether an identified region of light interference overlaps a safety region of interest. Such as a region in front of the vehicle or a region in a direction toward which the vehicle is turning. If so, the process goes to 634. If not, the process goes to 602 to process a next set of images.

At 634, the system may determine whether the light interference has been detected for a threshold period of time. For example, to avoid the situation in which a brief flash may be interpreted as light interference, the system may require that the light interference be detected consistently for a threshold time, such as a ½ second, 1 second, 1½ seconds, etc., rather than for a short transient period. Further, additional information may assist in this determination. For example, if a flashing light from an emergency vehicle causes transitory light interference, this may be determined in part by a microphone that concurrently detects a siren. If the system determines that the light interference has been detected for the threshold time, the process goes to 634. If not, the process goes to 602 to process a next set of images.

At 636, the system may send a communication to cause at least one action to be performed. For example, a processor or processing thread executing the light interference detection program 122 may send a notification to a processor or processing thread executing the vehicle control program 120 to indicate that light interference may be affecting the reliability of the images being processed by the image recognition program 118. In response, the vehicle control program 120 may perform one or more actions such as discussed below with respect to FIGS. 8-10. Alternatively, in other examples, the light interference detection program 122 may be configured to perform some or all of the actions described with respect to FIGS. 8-10. The light interference detection program 122 may repeat, e.g., continually at a set interval, or continuously until a stop instruction is received or a condition is met, or the like, to monitor for any light interference on received camera images.

Figure 7:
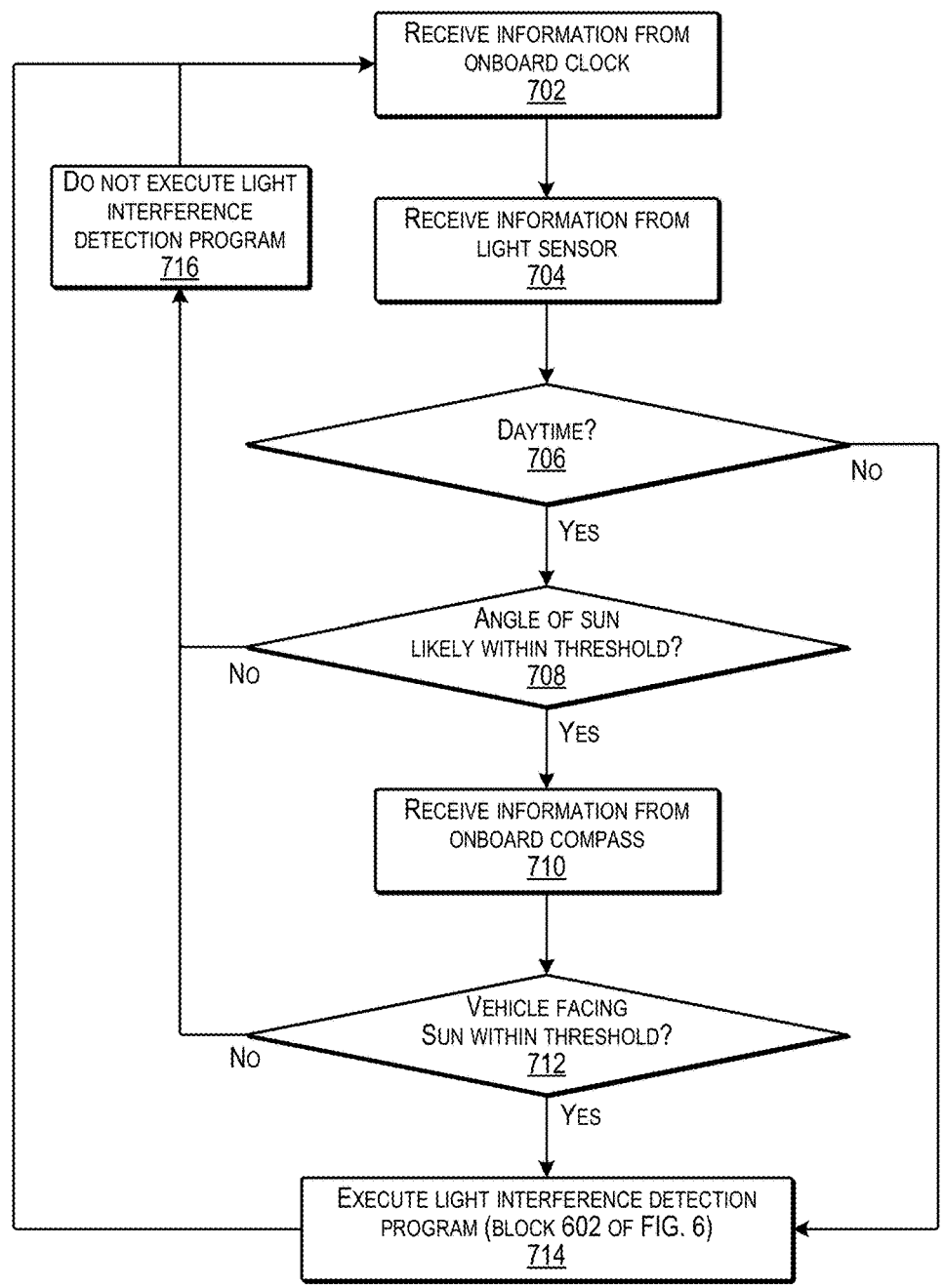
FIG. 7 is a flow diagram illustrating an example process for determining whether to execute the light interference detection program according to some implementations.

FIG. 7 is a flow diagram illustrating an example process 700 for determining whether to execute the light interference detection program 122 according to some implementations. In some examples, the process 700 may be executed by the systems 100, 200, and/or 300 discussed above, such as by execution of the recognition program 118, the light interference detection program 122, and/or the vehicle control program 120.

At 702, the system may receive information from the onboard clock. In some examples, the onboard clock may be associated with one of the processors 202, 302, while in other examples, the onboard clock may be separate from the processors.

At 704, the system may receive information from the light sensor. For example, the light sensor may be associated with the camera system 108, or may be separate from the camera system 108.

At 706, the system may determine whether the current time is daytime. For example, the light sensor and the clock input may both indicate whether the current time is daytime. If so, the process goes to 708. If not, the process goes to 714 to cause execution of the light interference detection program 122. In some examples, if the current time is nighttime, the light interference detection program 122 may be executed continuously, such as in case the vehicle encounters oncoming headlights of another vehicle.

At 708, after the system determines that the current time is daytime, the system may determine whether the angle of the sun is likely within a threshold sun height angle of the horizon. For instance, if the sun is predicted to be less than 30 degrees, 25 degrees, etc., above the horizon, then the sun may be likely to cause light interference with the camera system. If so, the process goes to 710. If not, the process goes to 716.

At 710, the system may receive information from the compass for determining whether the vehicle is currently heading in a direction of the sun. In some cases, the compass may be associated with a navigation system of the vehicle.

At 712, the system may determine whether the vehicle is facing the sun within a threshold heading angle likely to result in light interference. For example, if the vehicle is heading in a direction that if more than, e.g., 40, 45, etc. degrees to either side of the sun, then light interference may not be likely. If the vehicle is likely facing within the threshold angle of the sun, the process goes to 714. If not, the process goes to 716.

At 714, the system may execute the light interference detection program 122, such as described with respect to FIG. 6 above.

At 716, the system may not execute the light interference detection program 122. For example, if the light interference detection program 122 is not currently executing, then execution is not started. Further, if the light interference detection program 122 is currently being executed, then conditions may have changed and execution may no longer be required. For example, the sun may have risen above the threshold sun height angle, or the vehicle may no longer be facing the sun within the threshold heading angle.

Figure 8:
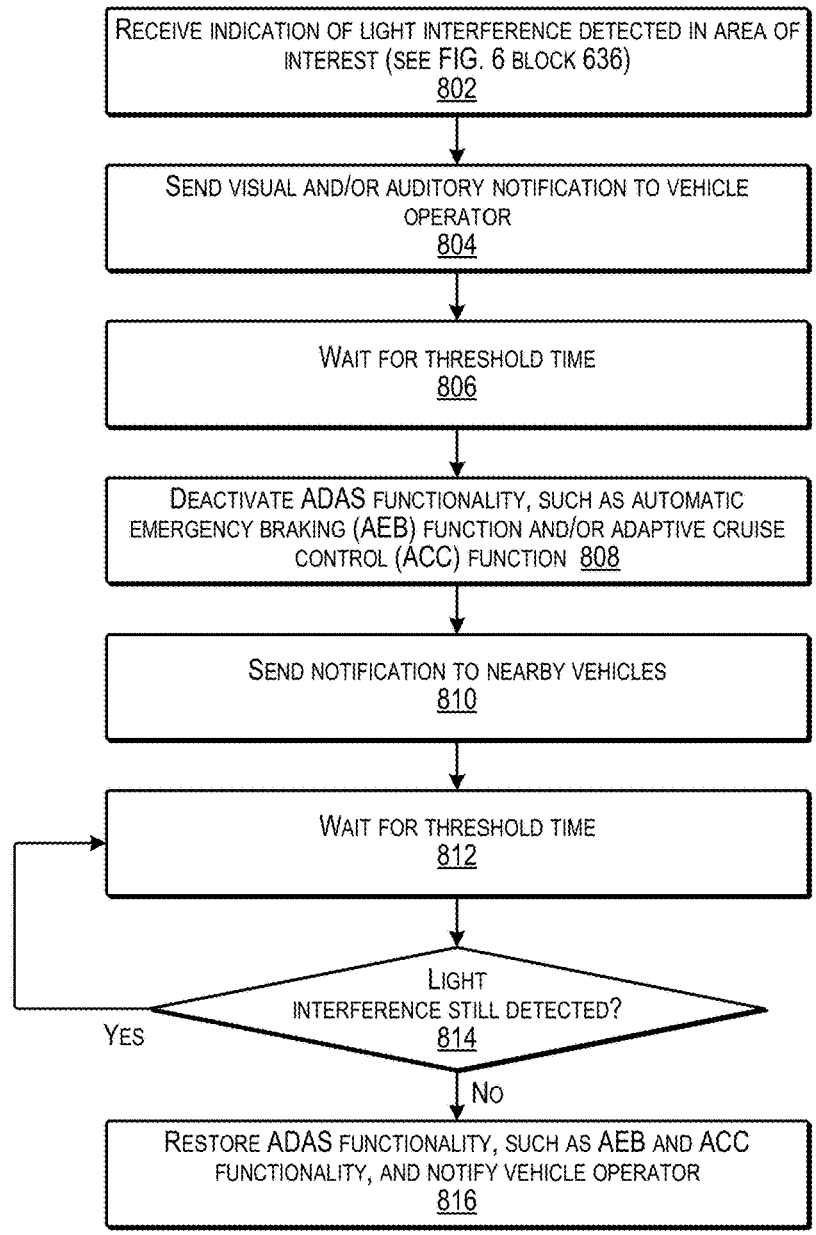
FIG. 8 is a flow diagram illustrating an example process for responding to light interference in the case of level 1-3 autonomy according to some implementations.

FIG. 8 is a flow diagram illustrating an example process 800 for responding to light interference in the case of level 1-3 autonomy according to some implementations. In some examples, the process 800 may be executed by the systems 100, 200, and/or 300 discussed above, such as by execution of the recognition program 118, the light interference detection program 122, and/or the vehicle control program 120.

At 802, the system may receive an indication of light interference detected in a safety area of interest, such as discussed above at block 636 of FIG. 6. For example, a processor or processing thread executing the light interference detection program 122 may send a notification to a processor or processing thread executing the vehicle control program 120 to indicate that light interference may be affecting the reliability of the images being processed by the image recognition program 118.

At 804, the system may send a visual and/or auditory notification to the vehicle operator. For example, the vehicle may display a notification to the operator and/or cause an alert to sound. Further, in some examples, the notification may recommend that the operator wash the windshield to reduce an amount of light that might be reflected toward the camera.

At 806, the system may wait for a threshold time. For example, rather than immediately disengaging an ADAS function, such as an automatic emergency braking (AEB) function and/or adaptive cruise control (ACC) function, the system may first provide a warning to the vehicle operator.

At 808, the system may deactivate ADAS systems, such as an AEB function and/or an ACC function.

At 810, the system may send a notification to nearby vehicles to provide a warning of poor lighting conditions.

At 812, the system may wait for a threshold time.

At 814, the system may determine whether light interference is still being detected. If so, the process returns to 812 to wait for an additional threshold time. If not, the process goes to 816.

At 816, based on light interference being no longer detected, the system may restore ADAS functionality, such as AEB and ACC functionality, and may notify the vehicle operator of such.

Figure 9:
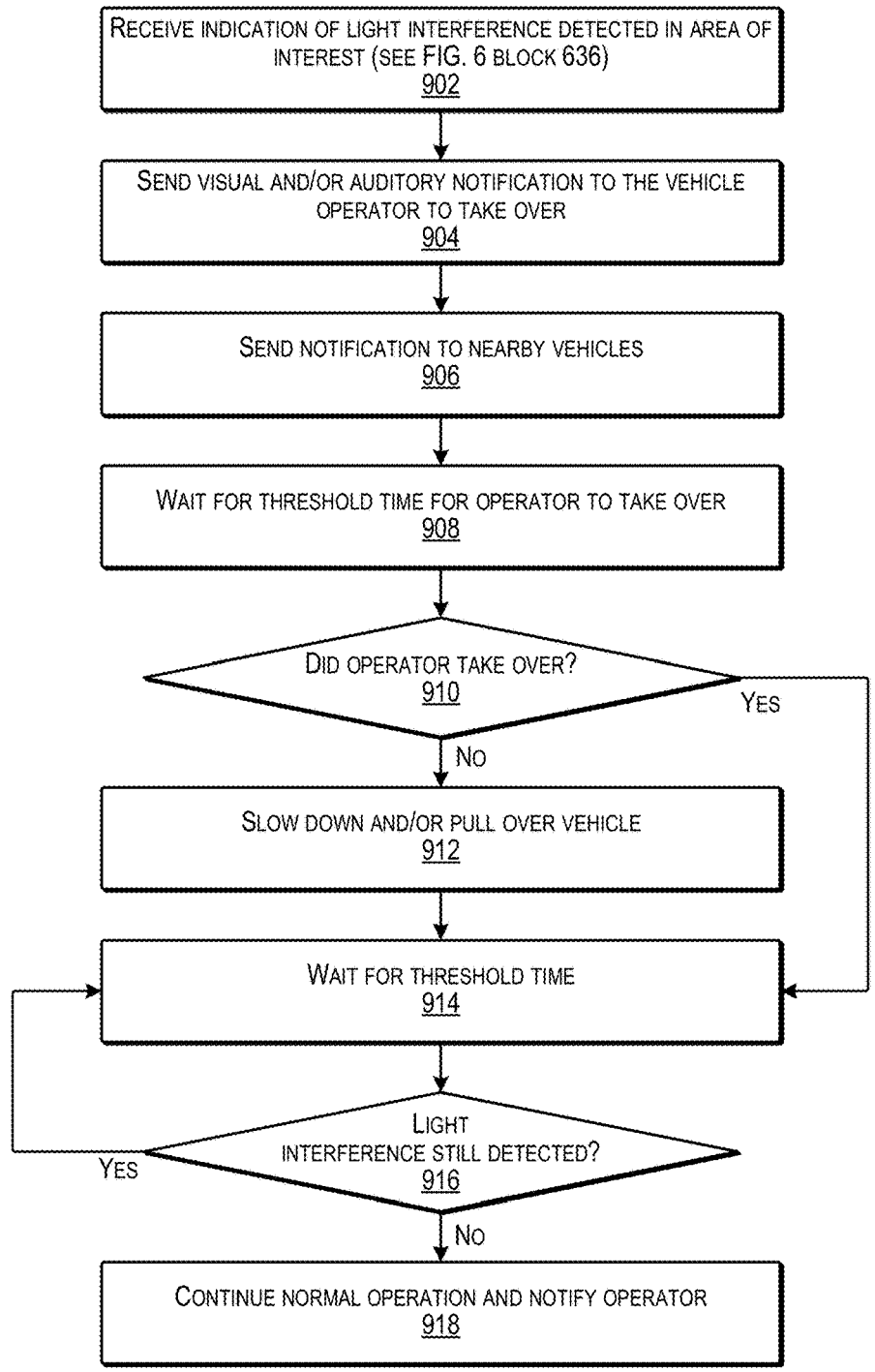
FIG. 9 is a flow diagram illustrating an example process for responding to light interference in the case of level 4 autonomy according to some implementations.

FIG. 9 is a flow diagram illustrating an example process 900 for responding to light interference in the case of level 4 autonomy according to some implementations. In some examples, the process 900 may be executed by the systems 100, 200, and/or 300 discussed above, such as by execution of the recognition program 118, the light interference detection program 122, and/or the vehicle control program 120.

At 902, the system may receive an indication of light interference detected in a safety area of interest, such as discussed above at block 636 of FIG. 6. For example, a processor or processing thread executing the light interference detection program 122 may send a notification to a processor or processing thread executing the vehicle control program 120 to indicate that light interference may be affecting the reliability of the images being processed by the image recognition program 118.

At 904, the system may send a visual and/or auditory notification to the vehicle operator to take over control of the vehicle. Further, in some examples, the notification may recommend that the operator wash the windshield to reduce an amount of light that might be reflected toward the camera.

At 906, the system may send a notification to nearby vehicles to provide a warning of poor lighting conditions.

At 908, the system may wait for a threshold time for the operator to take over control of the vehicle.

At 910, the system may determine whether the operator has taken control of the vehicle, such as by detecting one or more operator actions. If so, the process goes to 914. If not, the process goes to 912.

At 912, if the operator does not take control of the vehicle, the system may slow down and/or pull over the vehicle. For example, the system may check to determine whether the vehicle can safely pull over, and if so, may pull over and stop the vehicle. If not, the system may merely slow down the vehicle, or the like.

At 914, the system may wait for a threshold time for the light interference to end.

At 916, the system may determine whether light interference is still being detected. If so, the process returns to 914 to wait for an additional threshold time. If not, the process goes to 918.

At 918, when light interference is no longer being detected, the system may continue normal operation and may notify the vehicle operator.

Figure 10:
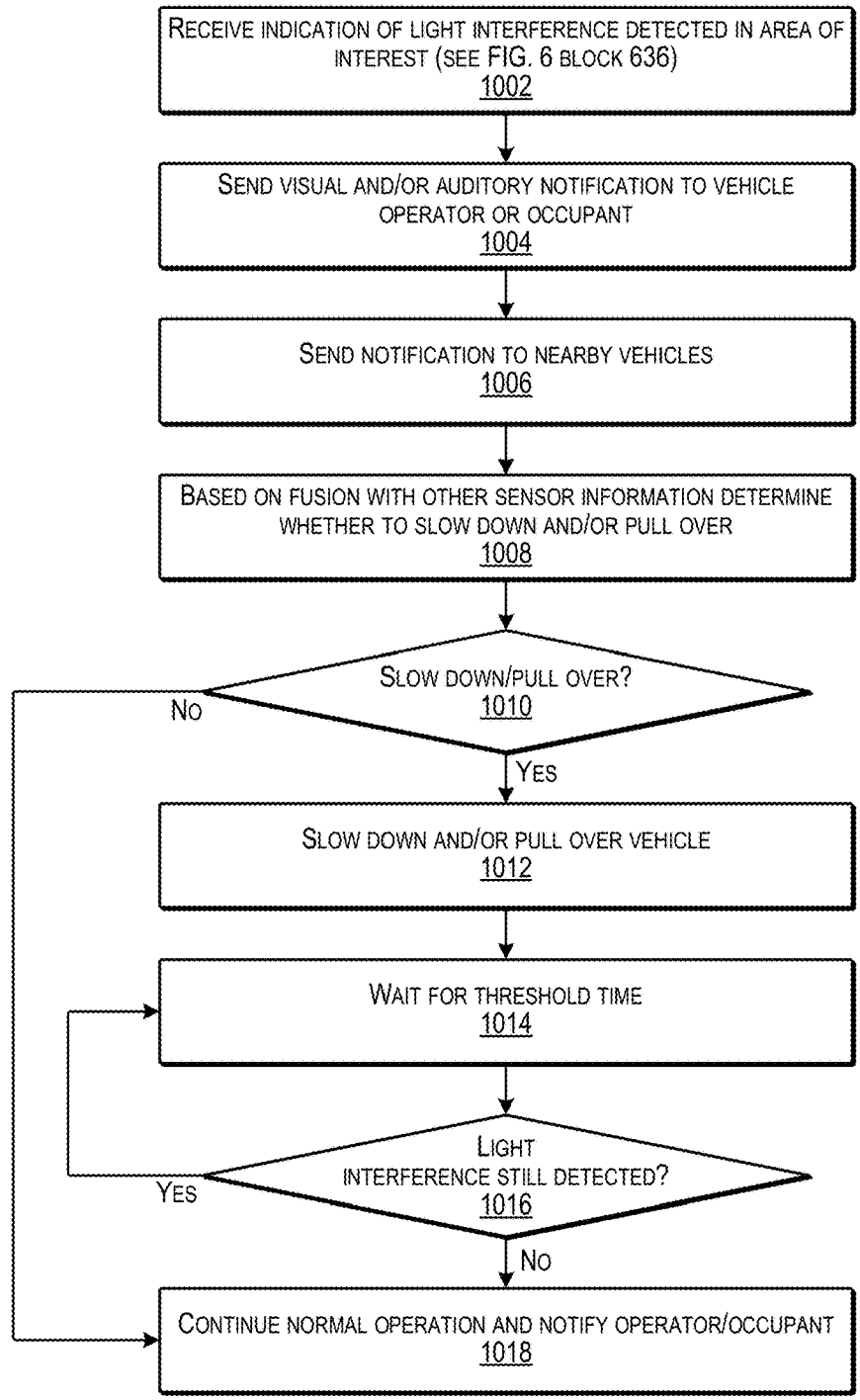
FIG. 10 is a flow diagram illustrating an example process for responding to light interference in the case of level 5 autonomy according to some implementations.

FIG. 10 is a flow diagram illustrating an example process 1000 for responding to light interference in the case of level 5 autonomy according to some implementations. In some examples, the process 1000 may be executed by the systems 100, 200, and/or 300 discussed above, such as by execution of the recognition program 118, the light interference detection program 122, and/or the vehicle control program 120.

At 1002, the system may receive an indication of light interference detected in a safety area of interest, such as discussed above at block 636 of FIG. 6. For example, a processor or processing thread executing the light interference detection program 122 may send a notification to a processor or processing thread executing the vehicle control program 120 to indicate that light interference may be affecting the reliability of the images being processed by the image recognition program 118.

At 1004, the system may send a visual and/or auditory notification to the vehicle occupant. For example, the vehicle may display a notification to the occupant and/or cause an alert to sound.

At 1006, the system may send a notification to nearby vehicles to provide a warning of poor lighting conditions.

At 1008, based on fusion with other sensor information, the system may determine whether to slow down and/or pull over, or alternatively, whether to proceed with current operation and rely on input from the other sensors for navigation until the light interference ends.

At 1010, the system may determine whether to slow down/pull over based on the fusion. If so, the process goes to 1012. If not, the process goes to 1018.

At 1012, the system may slow down and/or pull over the vehicle. For example, the system may check to determine whether the vehicle can safely pull over, and if so, may pull over and stop the vehicle. If not, the system may merely slow down the vehicle, or the like. Additionally, in some examples, the vehicle may spray the windshield and operate the windshield wipers to attempt reduce an amount of reflected light directed toward the camera.

At 1014, the system may wait for a threshold time for the light interference to end.

At 1016, the system may determine whether light interference is still being detected. If so, the process returns to 1012 to wait for an additional threshold time. If not, the process goes to 1016.

At 1018, when light interference is no longer being detected, the system may continue normal operation and may notify the vehicle operator/occupant.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system included in a vehicle, the system comprising:
one or more processors configured by executable instructions to perform operations comprising:
receiving, from a stereo camera mounted on the vehicle, a left image and a right image captured by the stereo camera;
generating, from the left image and the right image, a disparity image indicative of distances to features in the left image and the right image;
determining at least one region in a first image that corresponds to one of the left image or the right image, and that has a brightness that exceeds a brightness threshold;
determining at least one region in the disparity image having a level of disparity information below a disparity information threshold;
comparing the first image with the disparity image to determine an overlap between at least one of the regions in the first image and at least one of the regions in the disparity image;
determining a region of light interference based at least on the overlap; and
sending a communication to control at least one vehicle function based on the region of light interference.

2. The system as recited in claim 1, wherein the operation of determining the region of light interference based at least on the overlap further comprises determining that the overlap exceeds a minimum threshold size.

3. The system as recited in claim 1, wherein the operation of determining the region of light interference based at least on the overlap further comprises determining that the region of light interference overlaps a region corresponding to a direction of travel of the vehicle.

4. The system as recited in claim 1, the operations further comprising determining to execute a process for detecting the region of light interference, the process including the determining the at least one region in the first image, determining the at least one region in the disparity image, and the comparing the first image with the disparity image to determine the overlap, wherein determining to execute the process for detecting the region of light interference is based at least on:
determining that a current time is daytime based on receiving information from at least one of a light sensor or a clock;
determining that a likely position of the sun is within a threshold angle of a horizon;
receiving heading information from a compass; and
determining to execute the process for detecting light interference based at least on determining that a heading is within a heading threshold of the likely position of the sun.

5. The system as recited in claim 1, wherein the at least one vehicle function comprises a first vehicle function when the vehicle is operating under a first level of autonomy, or a second, different vehicle function when the vehicle is operating under a second, different level of autonomy.

6. The system as recited in claim 1, wherein the operation of determining at least one region that has a brightness that exceeds a brightness threshold further comprises:
applying a threshold to pixels of the first image; and
performing clustering on the pixels that exceed the threshold to determine the at least one region that has a brightness that exceeds the brightness threshold.

7. A method comprising:
receiving, by one or more processors, images from a camera mounted on a vehicle;
generating a disparity image based on features in at least one of the images;
determining at least one region in a first image of the received images that has a brightness that exceeds a brightness threshold;
determining at least one region in the disparity image having a level of disparity information below a disparity information threshold;
determining a region of light interference based at least on an overlap between the at least one region in the first image and the at least one region in the disparity image; and
performing at least one action based on the region of light interference.

8. The method as recited in claim 7, wherein determining the region of light interference based at least on the overlap further comprises determining that the overlap exceeds a minimum threshold size.

9. The method as recited in claim 7, wherein determining the region of light interference based at least on the overlap further comprises determining that the region of light interference overlaps a region corresponding to a direction of travel of the vehicle.

10. The method as recited in claim 7, wherein determining the region of light interference based at least on the overlap further comprises determining that the region of light interference is detected for a threshold time.

11. The method as recited in claim 7, wherein performing the at least one action comprises sending a communication to control at least one vehicle function.

12. The method as recited in claim 11, wherein the at least one vehicle function comprises a first vehicle function when the vehicle is operating under a first level of autonomy, or a second, different vehicle function when the vehicle is operating under a second, different level of autonomy.

13. The method as recited in claim 7, wherein the determining at least one region that has a brightness that exceeds a brightness threshold further comprises:
applying a threshold to pixels of the first image; and
performing clustering on the pixels that exceed the threshold to determine the at least one region that has a brightness that exceeds the brightness threshold.

14. A system comprising:
one or more processors configured by executable instructions to perform operations comprising:
receiving images from a camera mounted on a vehicle;
generating a disparity image based on features in at least one of the images;
determining at least one region in a first image of the received images that has a brightness that exceeds a brightness threshold;
determining at least one region in the disparity image having a level of disparity information below a disparity information threshold;
determining a region of light interference based at least on an overlap between the at least one region in the first image and the at least one region in the disparity image; and
performing at least one action based on the region of light interference.

15. The system as recited in claim 14, wherein the operation of determining the region of light interference based at least on the overlap further comprises determining that the overlap exceeds a minimum threshold size.

16. The system as recited in claim 14, wherein the operation of determining the region of light interference based at least on the overlap further comprises determining that the region of light interference overlaps a region corresponding to a direction of travel of the vehicle.

17. The system as recited in claim 14, the operations further comprising determining to execute a process for detecting the region of light interference, the process including the determining the at least one region in the first image, determining the at least one region in the disparity image, and the comparing the first image with the disparity image to determine the overlap, wherein determining to execute the process for detecting the region of light interference is based at least on:
determining that a current time is daytime based on receiving information from at least one of a light sensor or a clock;
determining that a likely position of the sun is within a threshold angle of a horizon;
receiving heading information from a compass; and
determining to execute the process for detecting light interference based at least on determining that a heading is within a heading threshold of the likely position of the sun.

18. The system as recited in claim 14, wherein the operation of performing the at least one action comprises sending a communication to control at least one vehicle function.

19. The system as recited in claim 18, wherein the at least one vehicle function comprises a first vehicle function when the vehicle is operating under a first level of autonomy, or a second, different vehicle function when the vehicle is operating under a second, different level of autonomy.

20. The system as recited in claim 14, wherein the operation of determining at least one region that has a brightness that exceeds a brightness threshold further comprises:
applying a threshold to pixels of the first image; and
performing clustering on the pixels that exceed the threshold to determine the at least one region that has a brightness that exceeds the brightness threshold.

* * * * *